US012527704B2

(12) United States Patent
Peyton et al.

(10) Patent No.: US 12,527,704 B2
(45) **Date of Patent: *Jan. 20, 2026**

(54) ADJUSTABLE SEAT CUSHION

(71) Applicant: PERMOBIL, INC., Lebanon, TN (US)

(72) Inventors: Ross Peyton, St. Louis, MO (US); Conor Sullivan, St. Louis, MO (US)

(73) Assignee: PERMOBIL, INC., Lebanon, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/393,311

(22) Filed: Dec. 21, 2023

(65) Prior Publication Data

US 2024/0342024 A1 Oct. 17, 2024

Related U.S. Application Data

(63) Continuation of application No. 16/943,329, filed on Jul. 30, 2020, now Pat. No. 11,857,471.

(51) Int. Cl.

| | |
|---|---|
| ***A61G 5/10*** | (2006.01) |
| ***A47C 7/14*** | (2006.01) |
| ***A47C 7/18*** | (2006.01) |

(52) U.S. Cl.

CPC ............ *A61G 5/1045* (2016.11); *A47C 7/142* (2018.08); *A47C 7/18* (2013.01)

(58) Field of Classification Search

None

See application file for complete search history.

(56) References Cited

U.S. PATENT DOCUMENTS

| | | | |
|---|---|---|---|
| D169,366 | S | 4/1953 | Feldman |
| 3,987,507 | A | 10/1976 | Hall |
| 4,132,228 | A | 1/1979 | Green |
| 4,643,481 | A | 2/1987 | Saloff et al. |
| 4,660,238 | A | 4/1987 | Jay |
| 4,682,818 | A | 7/1987 | Morell |
| 4,698,864 | A | 10/1987 | Graebe |
| 4,753,480 | A | 6/1988 | Morell |
| 4,930,171 | A | 6/1990 | Frantz |
| 4,951,336 | A | 8/1990 | Silverman |
| 5,144,705 | A | 9/1992 | Rogers |
| 5,163,737 | A | 11/1992 | Navach et al. |
| 5,226,188 | A | 7/1993 | Liou |
| 5,333,921 | A | 8/1994 | Dinsmoor, III |
| 5,352,023 | A | 10/1994 | Jay et al. |
| 5,369,829 | A | 12/1994 | Jay |

(Continued)

FOREIGN PATENT DOCUMENTS

| | | |
|---|---|---|
| EP | 0093065 A1 | 11/1983 |

OTHER PUBLICATIONS

International Search Report and Written Opinion for Application No. PCT/US2020/064383 dated Apr. 12, 2021 (12 pages).

*Primary Examiner* — Timothy J Brindley

(74) *Attorney, Agent, or Firm* — Michael Best & Friedrich LLP

(57) ABSTRACT

A seat cushion assembly includes a base defining a leg support, a support portion recessed relative to the leg support, and a well recessed relative to the support portion, and an air pad assembly including a first air support member and a second air support member, the first air support member being positioned on the recessed support portion, and the second air support member being removably received by the well.

17 Claims, 10 Drawing Sheets

(56) References Cited

U.S. PATENT DOCUMENTS

| | | | | |
|---|---|---|---|---|
| 5,378,045 | A | 1/1995 | Siekman et al. | |
| 5,390,384 | A | 2/1995 | Dinsmoor, III et al. | |
| 5,395,162 | A | 3/1995 | Jay et al. | |
| 5,461,741 | A | 10/1995 | Graebe | |
| 5,522,106 | A | 6/1996 | Harrison et al. | |
| 5,551,107 | A | 9/1996 | Graebe | |
| 5,592,707 | A | 1/1997 | Dinsmoor, III et al. | |
| 5,613,256 | A | 3/1997 | Hanson | |
| D399,694 | S | 10/1998 | Laidlaw | |
| 5,836,654 | A | 11/1998 | Debellis et al. | |
| 5,839,140 | A | 11/1998 | Wilkerson | |
| 5,857,749 | A | 1/1999 | Debellis et al. | |
| D405,033 | S | 2/1999 | Liegnell | |
| 6,018,832 | A | 2/2000 | Graebe | |
| 6,161,238 | A | 12/2000 | Graebe | |
| 6,241,320 | B1 | 6/2001 | Chew et al. | |
| D463,701 | S * | 10/2002 | Borcherding | D6/601 |
| 6,502,263 | B1 | 1/2003 | Rowley et al. | |
| 6,564,410 | B2 | 5/2003 | Graebe et al. | |
| 6,668,405 | B1 | 12/2003 | Kohlman | |
| 6,901,617 | B2 | 6/2005 | Sprouse, II et al. | |
| 6,990,744 | B2 | 1/2006 | Bieganek et al. | |
| 7,140,057 | B2 | 11/2006 | Hetzel et al. | |
| 7,146,666 | B2 | 12/2006 | Christofferson et al. | |
| 7,216,388 | B2 | 5/2007 | Bieganek et al. | |
| 7,220,376 | B2 | 5/2007 | Hetzel et al. | |
| 7,373,678 | B2 | 5/2008 | Hetzel et al. | |
| 7,395,566 | B2 | 7/2008 | Hetzel et al. | |
| 7,445,292 | B2 | 11/2008 | Moule | |
| 7,891,033 | B2 | 2/2011 | Loewenthal et al. | |
| D643,665 | S | 8/2011 | Goeckel et al. | |
| D645,284 | S * | 9/2011 | Goeckel | D6/601 |
| D645,285 | S | 9/2011 | Goeckel et al. | |
| D647,344 | S | 10/2011 | Goeckel et al. | |
| D647,345 | S | 10/2011 | Goeckel et al. | |
| D647,347 | S | 10/2011 | Klotz | |
| D647,348 | S | 10/2011 | Klotz | |
| 8,177,302 | B2 | 5/2012 | Carlson et al. | |
| 8,584,286 | B2 * | 11/2013 | Call | A47C 27/06 5/655.5 |
| 9,125,493 | B2 | 9/2015 | Siekman et al. | |
| 9,635,897 | B2 | 5/2017 | Prust et al. | |
| 9,763,522 | B2 | 9/2017 | Siekman et al. | |
| 11,173,975 | B1 * | 11/2021 | Sprouse, II | B62J 1/10 |
| 2003/0019040 | A1 | 1/2003 | Rowley et al. | |
| 2005/0023872 | A1 | 2/2005 | Hetzel et al. | |
| 2007/0001505 | A1 | 1/2007 | Marshall et al. | |
| 2008/0196166 | A1 * | 8/2008 | Fraser | A47C 7/021 5/654 |
| 2009/0160236 | A1 | 6/2009 | Tsuber et al. | |
| 2015/0115678 | A1 | 4/2015 | Hosbach et al. | |
| 2015/0209206 | A1 | 7/2015 | Bargellini et al. | |
| 2015/0298753 | A1 | 10/2015 | Rouland et al. | |
| 2016/0007671 | A1 | 1/2016 | Prust et al. | |
| 2017/0127845 | A1 | 5/2017 | Bhat et al. | |
| 2018/0326881 | A1 * | 11/2018 | Patrick | B60N 2/914 |
| 2019/0183257 | A1 * | 6/2019 | Arzanpour | A47C 7/142 |

* cited by examiner

ADJUSTABLE SEAT CUSHION

CROSS-REFERENCE TO RELATED APPLICATIONS

The present application is a continuation of U.S. patent application Ser. No. 16/943,329, which was filed on Jul. 30, 2020 and entitled "Adjustable Seat Cushion," the entire contents of which is hereby incorporated by reference.

FIELD

The present disclosure relates to an adjustable seat cushion assembly for a wheelchair. More specifically, the present disclosure relates to an improved seat cushion that incorporates different materials for user support, and is adjustable to improve positional stability of a user while selectively offloading pressure from a user's ischial tuberosity.

BACKGROUND

Seat cushions are generally known in the art. Seat cushions provide support to an individual while sitting. Individuals who are confined to a wheelchair can suffer from tissue breakdown, pressure sores, and other injuries caused by prolonged sitting. These injuries can be difficult to treat. In addition, while sitting, a substantial amount of a user's weight is concentrated in the region of the ischia and ischial tuberosity, which is the bony prominence of the buttocks and can be referred to as the "sit bones." Unless a user frequently moves, blood flow to the skin tissue in these regions can decrease, resulting in tissue degradation. Cushions designed for wheelchairs exist for reducing the concentration of weight in the region of the ischia. Some of these cushions generally seek to redistribute a user's weight more uniformly over a larger area of the buttocks. Unfortunately, known cushions have limited adjustability. Further, those that are adjustable require a user to be removed from the cushion to facilitate adjustment. Accordingly, there is a need for an adjustable cushion that can provide adjustment without user removal, improve positional stability while sitting, reduce pressure related injuries, and allow a user to offload their ischial tuberosity.

SUMMARY

In one embodiment, the disclosure provides a seat cushion assembly that includes a base defining a leg support and a support portion recessed relative to the leg support, and an air pad assembly positioned on the recessed support portion. The air pad assembly includes a plurality of independent air support zones that are configured to be separately inflated and deflated.

In another embodiment, the disclosure provides a seat cushion assembly that includes a base defining a leg support and a support portion recessed relative to the leg support, a pelvic well defined by the support portion, and a first air support member defining a first air bladder and a second air bladder, each air bladder includes a plurality of air cells, the plurality of air cells of the first air bladder are fluidly connected, the plurality of air cells of the second air bladder are fluidly connected, the first air bladder is separate from the second air bladder, and the first air support member extends partially around the pelvic well.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

While the present disclosure illustrates an adjustable seat cushion assembly 10 that is configured for use with a chair, and more specifically a wheelchair, it should be appreciated that the adjustable seat cushion assembly 10 is not limited for use with a wheelchair. The adjustable seat cushion assembly 10 can be used with any suitable chair or support device suitable to support a person while sitting. Accordingly, as used herein, the term "chair" can include, but is not limited to, a wheelchair, an armchair, a rocking chair, a car seat, a swivel chair, an office chair, a recliner, a director's chair, a high chair, a sofa, a backed stool, and/or any clinical/medical chair such as a surgical chair, dental chair, chiropractic chair or massage chair. Accordingly, the adjustable seat cushion assembly 10 can be positioned on (or connected to or mounted on) any such suitable chair, and then adjusted to provide suitable support for a person that is sitting in the chair.

Referring now to the figures, FIGS. 1-9 illustrate an example of an embodiment of the adjustable seat cushion assembly 10. The adjustable seat cushion assembly 10 is configured to be positioned on (or mounted to) a suitable chair, such as a wheelchair (not shown). The adjustable seat cushion assembly 10 is configured to selectively support a user through a first support material (e.g., foam) and a second support material (e.g., air) to improve positional stability, reduce pressure related injury, and allow a user to offload their ischial tuberosity (or "sit bones").

Figure 1:
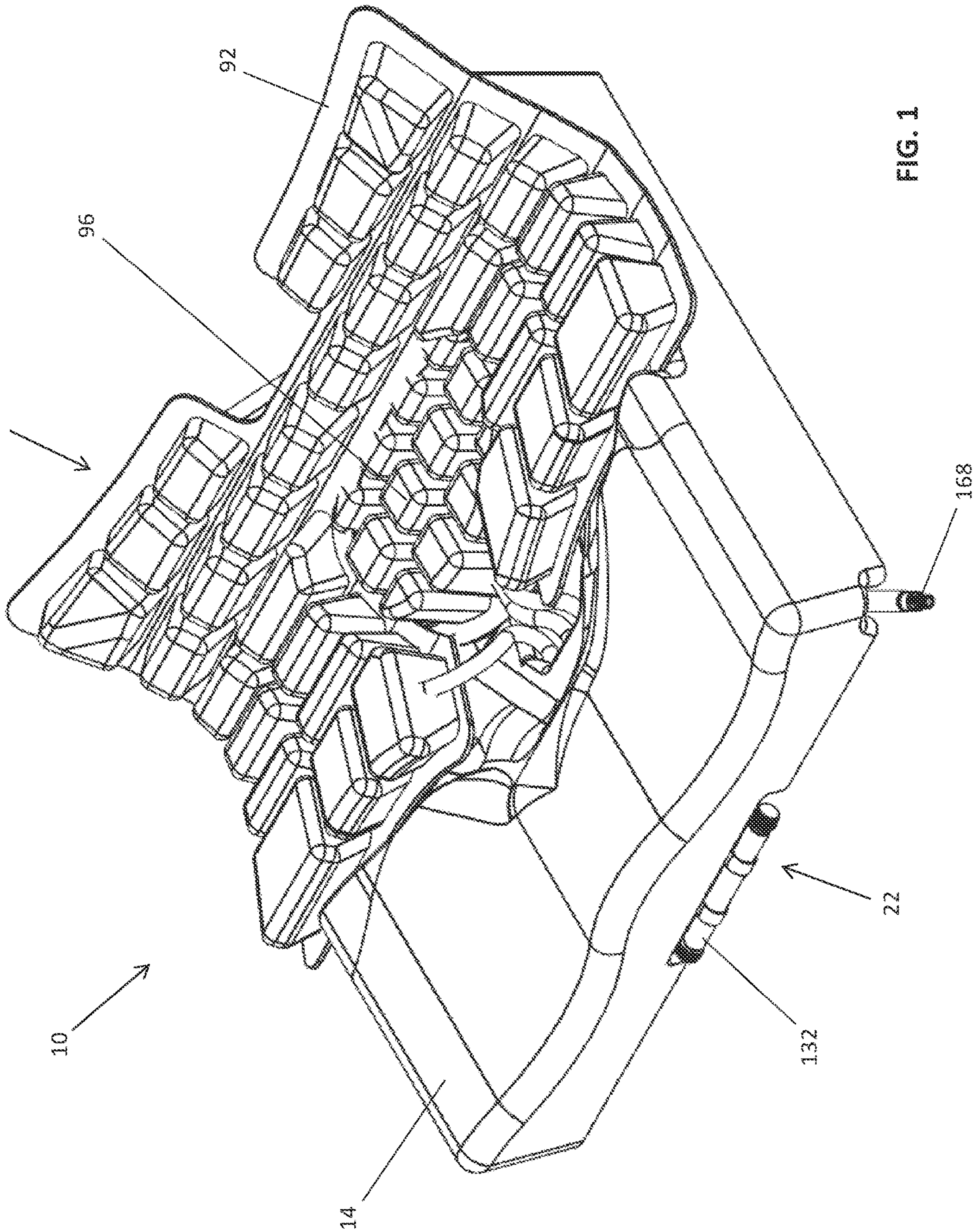
FIG. 1 is a perspective view of an embodiment of an adjustable seat cushion assembly for use with a chair.

With reference now to FIG. 1, the adjustable seat cushion assembly 10 is shown without a cover. The adjustable seat cushion assembly 10 includes a base 14 and an adjustable air pad assembly 18. An airflow control assembly 22 is in fluid communication with the adjustable air pad assembly 18.

The adjustable seat cushion assembly 10 shown in FIG. 1 can be positioned within (or covered by) the cover (not shown). The cover is configured to contact the body of a user. The cover can be made of any material suitable for user contact, such as nylon, SPANDEX, a blend thereof, or any other suitable material (or combination of materials) that reduces the risk of user skin irritation, skin or soft tissue breakdown, sores, and/or any category or stage of pressure related injury. The cover is also configured to be removable in order to facilitate cleaning, laundering, or replacement.

Figure 2:
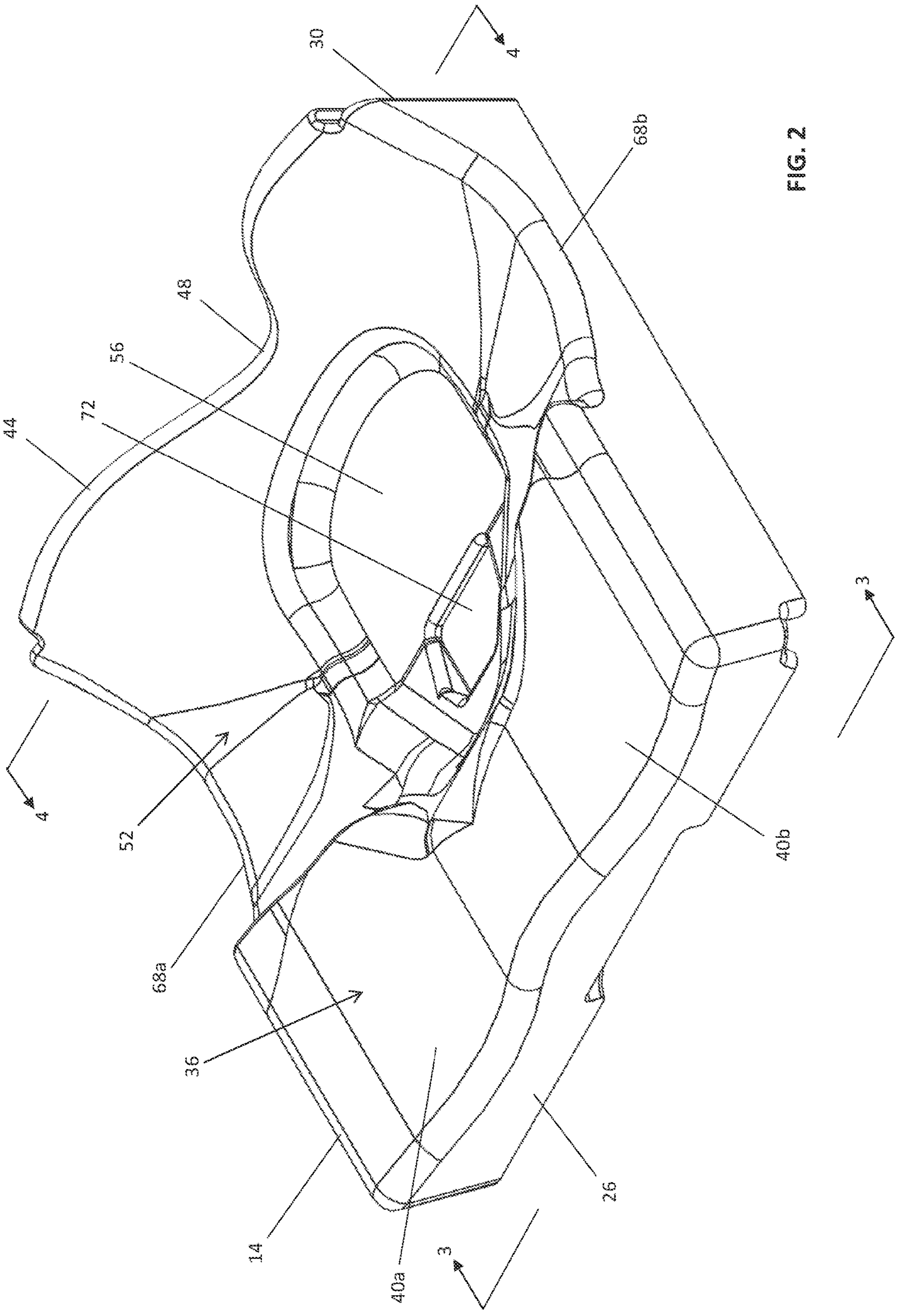
FIG. 2 is a perspective view of the base of the adjustable seat cushion assembly of FIG. 1, with an adjustable air pad assembly and an airflow control assembly removed.
Figure 3:
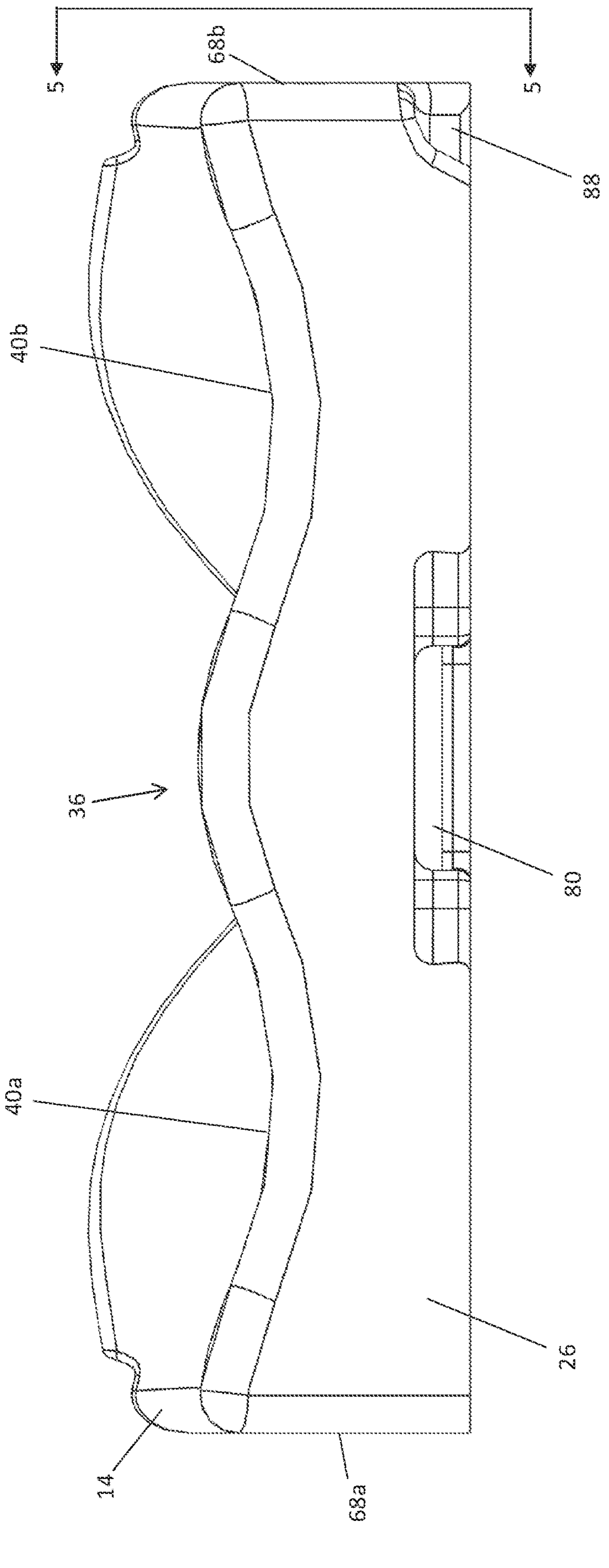
FIG. 3 is a front view of the base shown in FIG. 2, taken along line 3-3 of FIG. 2.

With reference now to FIG. 2, the base 14 is shown with the air pad assembly 18 and airflow control assembly 22 removed. The base 14 includes a front end 26 opposite a back end 30. A leg support 36 is positioned towards the front end 26. As shown in FIGS. 2-3, the leg support 36 defines a pair of recessed leg troughs 40*a*, 40*b*. The leg support 36 and associated leg troughs 40*a*, 40*b* are contoured to support a thigh area of each leg.

Figure 4:
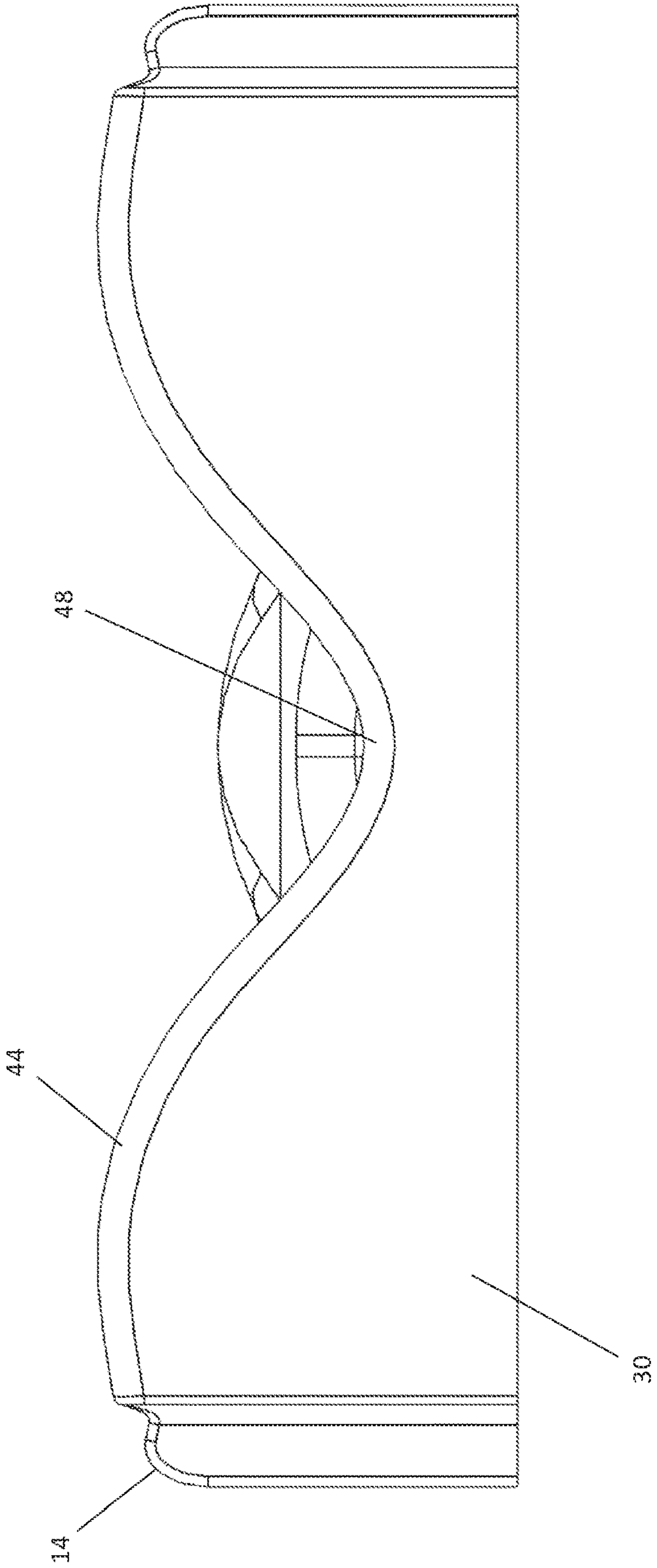
FIG. 4 is a back view of the base shown in FIG. 2, taken along line 4-4 of FIG. 2.

With reference to FIGS. 2 and 4, the base 14 defines a raised back ledge 44 (also referred to as a cantle 44). The back ledge 44 is positioned towards the back end 30 of the base 14. The back ledge 44 includes a central channel 48.

Figure 5:
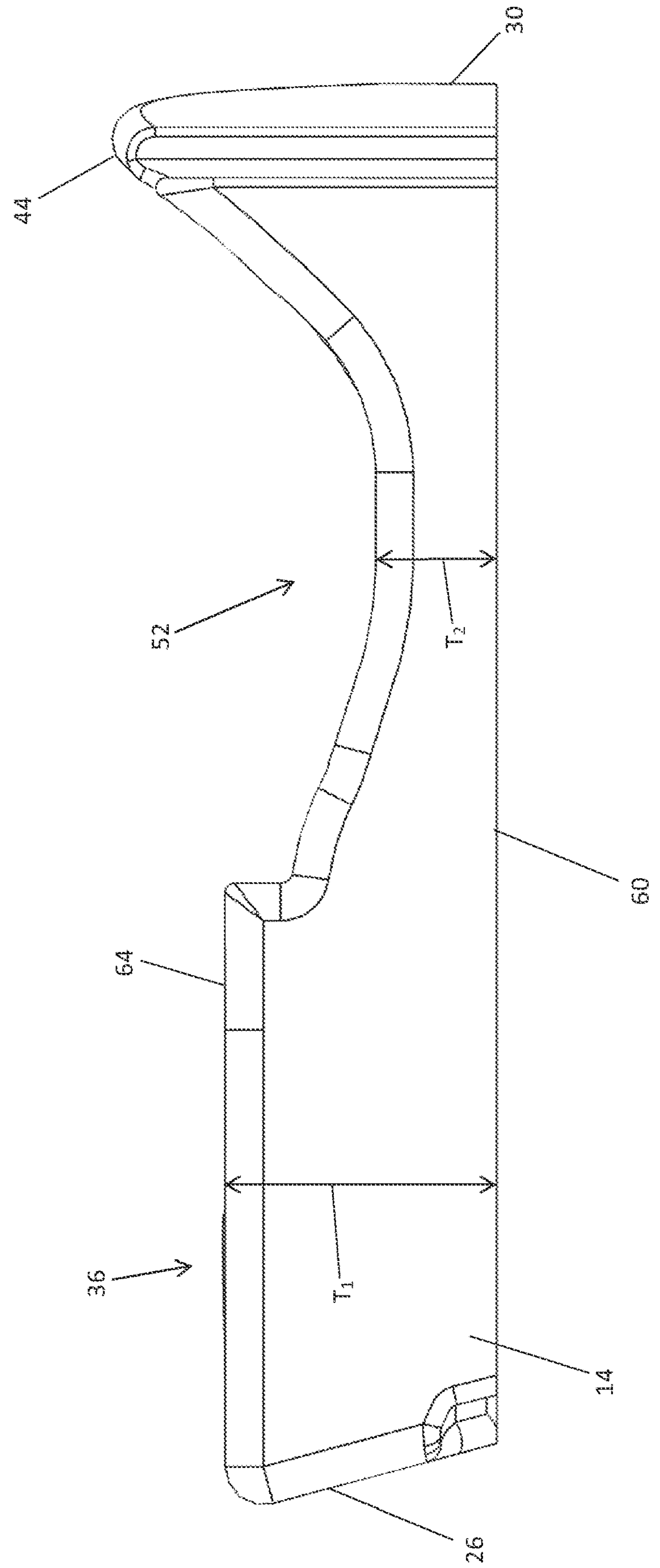
FIG. 5 is a side view of the base shown in FIG. 2, taken along line 5-5 of FIG. 3.

Referring to FIGS. 2 and 5, the base 14 includes a recessed support portion 52 (also referred to as a pelvic support portion 52) positioned between the leg support 36 and the back ledge 44. The recessed support portion 52 defines a pelvic well 56 (or a well 56). The support portion 52 is recessed relative to (or below) the leg support 36. As shown in FIG. 5, a first thickness $T_1$ of the base 14 at the leg support 36 is greater than a second thickness $T_2$ of the base 14 at the recessed support portion 52. The first thickness $T_1$ and the second thickness $T_2$ are both measured from a bottom surface 60 to a user contact surface 64 of the base 14. With reference back to FIG. 2, the support portion 52 is sloped from each respective side 68*a*, 68*b* of the base 14, the leg support 36, and the back ledge 44 toward the pelvic well 56. The slope is an increasing depth (or increasing recess) such that the pelvic well 56 defines the deepest recess into the base 14. The pelvic well 56 also defines an aperture 72 that extends entirely through the base 14.

Figure 6:
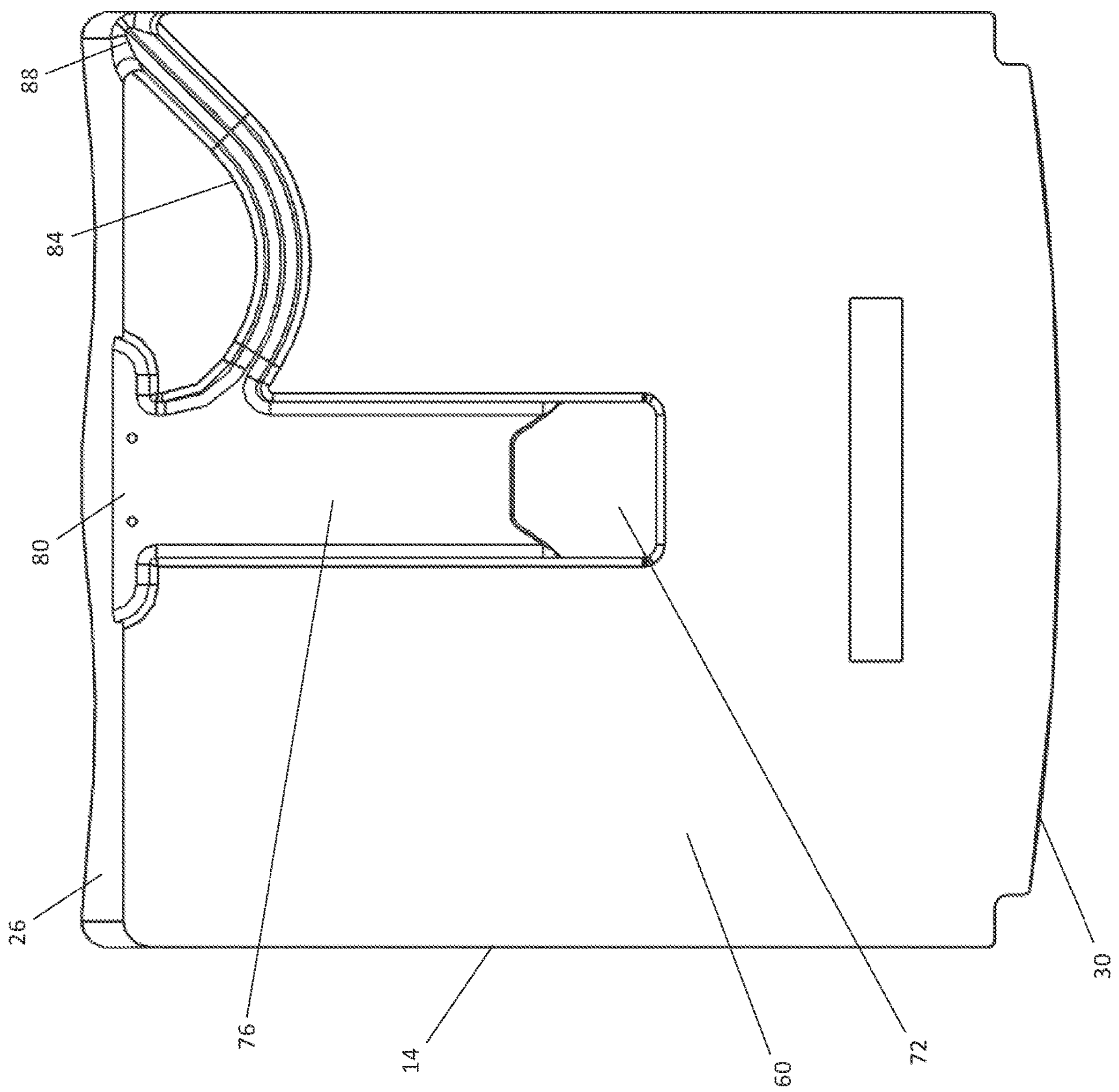
FIG. 6 is a bottom view of the base shown in FIG. 2.

With reference to FIG. 6, the bottom surface 60 of the base 14 includes a recessed channel 76. The recessed channel 76 extends from a valve access end 80 (or a first end 80) to the aperture 72. A secondary channel 84 extends from the recessed channel 76 to an air nozzle access end 88. As shown in FIGS. 3 and 6, the valve access end 80 is positioned in the front end 26 of the base 14. The air nozzle access end 88 is positioned at a corner of the base 14 between the front end 26 and a second side 68*b*. It should be appreciated that one or both of the valve access end 80 and/or the air nozzle access end 88 can be positioned at any location in the base 14 suitable to provide user access to a valve and/or an air nozzle. For example, the valve access end 80 and/or the air nozzle access end 88 can be positioned in the front end 26, the back end 30, a first side 68*a*, the second side 68*b*, or a corner (or transition) between the front end 26 and a side 68*a*, 68*b*, or the back end 30 and a side 68*a*, 68*b*.

The base 14 can be constructed of a first material. In the illustrated embodiment, the base 14 is formed of a firm foam material as the first material. In other embodiments, the base 14 can be constructed of multiple plies of material. For example, the base 14 can have a first layer of firm, dense support foam. A second layer of cushioning (or softer or less firm) foam can be positioned onto the first layer in targeted areas that contact a user, such as the leg support 36. In yet other embodiments, the base 14 can be constructed of any material suitable for providing support to a user while sitting. The first material is provided to support a portion of a user.

Figure 7:
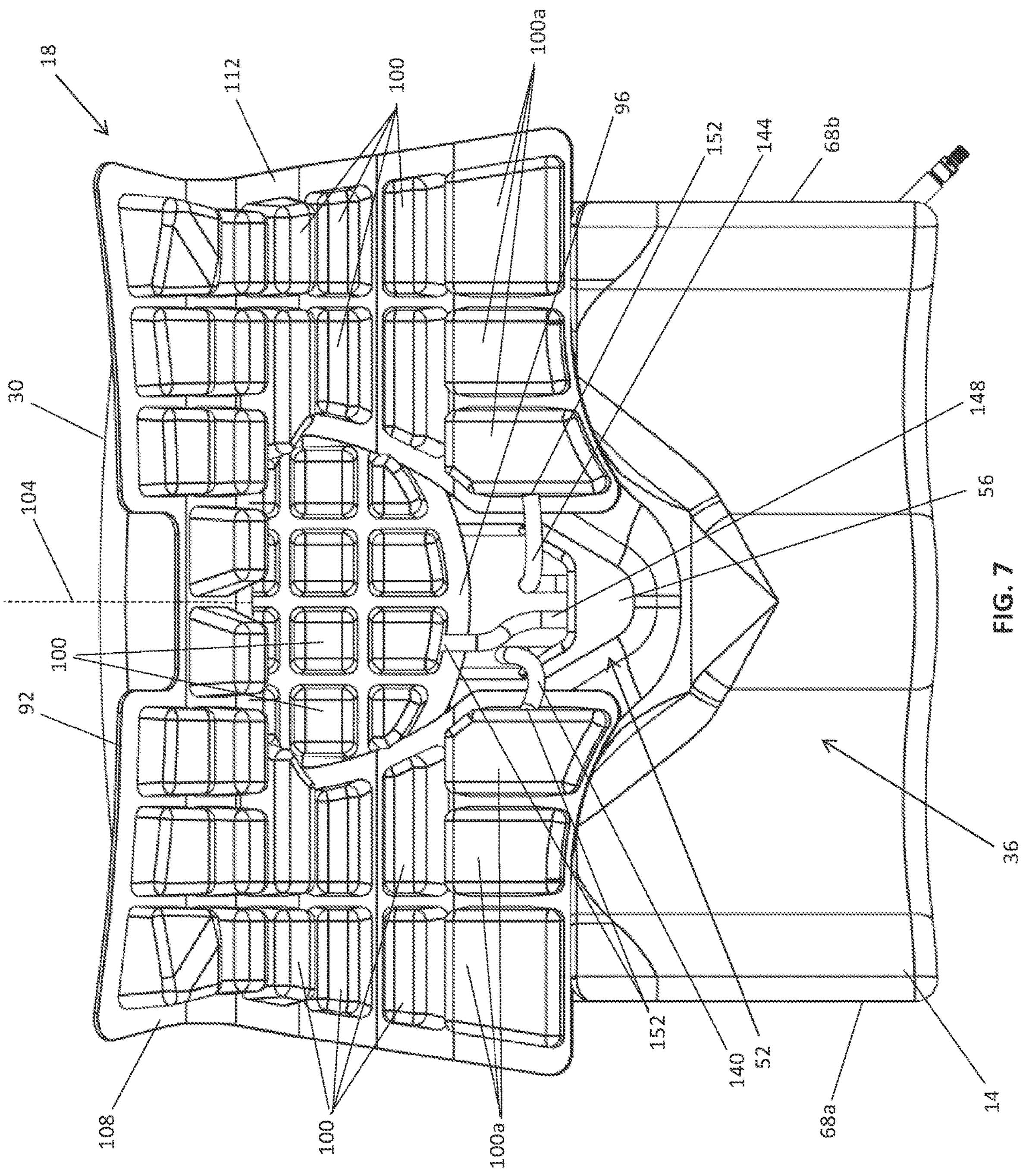
FIG. 7 is a top view of the adjustable seat cushion assembly of FIG. 1.
Figure 8:
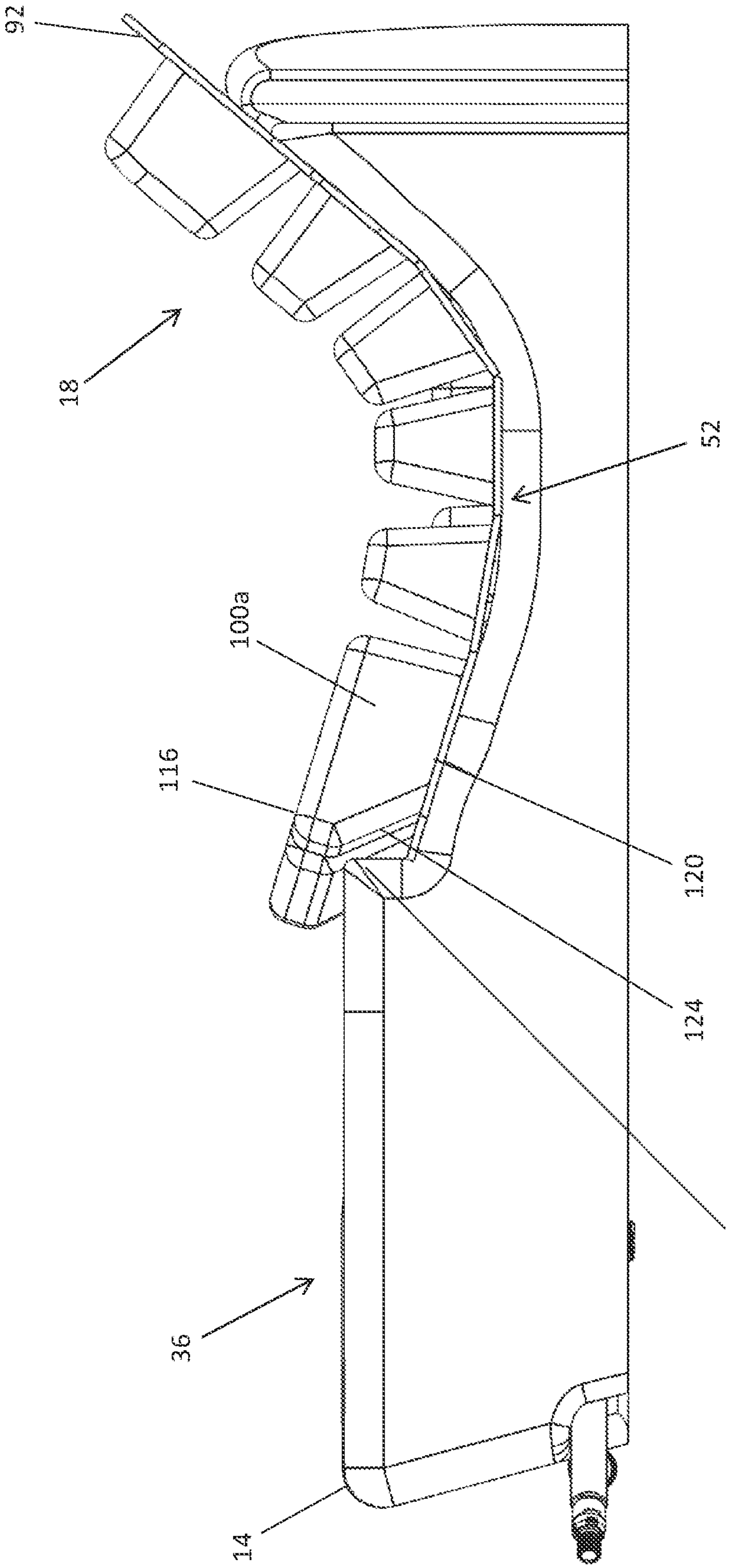
FIG. 8 is a side view of the adjustable seat cushion assembly of FIG. 1.

With reference now to FIGS. 1, 7, and 8, the adjustable air pad assembly 18 is configured to be positioned in the support portion 52 of the base 14. The adjustable air pad assembly 18 includes a first air support member 92 and a separate, second air support member 96 (shown in FIGS. 1 and 7). The first air support member 92 and the second air support member 96 are both removable from the support portion 52 to provide selective, customized support for a user. The air pad assembly 18 provides air as a second material to support a portion of a user.

With specific reference to FIG. 7, the first air support member 92 defines two separate air bladders (not shown). Each air bladder has a plurality of air cells 100, 100*a*. The first air support member 92 has an axis of symmetry 104 that separates a first side support 108 (also referred to as a right side support 108 or a first support 108) and a second side support 112 (also referred to as a left side support 112 or a second support 112). As such, the first side support 108 and the second side support 112 are symmetrical. The first side support 108 defines a first air bladder (or first air chamber or first internal air chamber) (not shown) that includes a plurality of air cells 100, 100*a* (or a first plurality of air cells 100, 100*a*). The first plurality of air cells 100, 100*a* in the first side support 108 are in fluid communication with each other (or are fluidly interconnected). The second side support 112 defines a second air bladder (or second air chamber or second internal air chamber) (not shown) that includes a plurality of air cells 100, 100*a* (or second plurality of air cells 100, 100*a*). The second plurality of air cells 100, 100*a* in the second side support 112 are in fluid communication with each other (or are fluidly interconnected). The first and second air bladders are separate and not directly fluidly connected to each other. As such, air cannot directly flow between the first and second air bladders. Accordingly, the first and second side supports 108, 112 are separate and not directly fluidly connected to each other. Air in the first side support 108 cannot directly flow into the second side support 112, and air in the second side support 112 cannot directly flow into the first side support 108. Thus, air in one of the side supports 108, 112 does not migrate to the other side support 112, 108 as a user moves, providing a more stable support platform. Each side support 108, 112 is also configured for separate, selective adjustment of an inflation level. The inflation level is a desired quantity of air within the associated air bladder. The desired inflation level can be achieved by either inflation or deflation of the air bladder in response to the quantity of air within the air bladder.

When positioned in the support portion 52, the first air support member 92 partially surrounds the pelvic well 56. More specifically, the first air support member 92 extends between the first side 68*a* and the pelvic well 56, extends between the back ledge 44 and the pelvic well 56, and extends between the second side 68*b* and the pelvic well 56. As such, the first air support member 92 has a generally U-shape (or horseshoe shape). However, the first air support member 92 does not cover (or overlap) the pelvic well 56.

With reference to FIGS. 7-8, the air cells 100*a* of the first air support member 92 that are positioned proximate (or adjacent) to the leg support 36 have a cross-sectional shape that is distinct from the remaining air cells 100. As illustrated in FIG. 8, the air cells 100*a* have an overhang (or undercut) cross-sectional shape. Stated another way, a first portion 116 of each air cell 100*a* that contacts a user has a greater length than a second portion 120 of each air cell 100*a* that is connected to the first air support member 92. A sloped portion 124 extends between the first portion 116 and the second portion 120. When the first air support member 92 is positioned on the support portion 52, the air cells 100*a* are positioned adjacent the leg support 36. A transitional edge 128 between the leg support 36 and the recessed support portion 52 is positioned near the sloped portion 124 of the air cells 100*a*. Thus, the first portion 116 of each air cell 100*a* extends over the transitional edge 128. This reduces potential the risk of skin irritation, abrasion, or other skin or soft tissue breakdown caused by contact with the transitional edge 128. In the illustrated embodiment, the air cells 100*a* are aligned in a row extending from the first side 68*a* to the second side 68*b* of the base 14. In other embodiments, the air cells 100*a* can be arranged from the first side 68*a* to the second side 68*b* of the base 14 in a random pattern, in a laterally offset pattern, an alternating pattern, or any other suitable pattern to provide suitable support for a user. In the illustrated embodiment, the cross-sectional shape of the air cells 100*a* are different than the air cells 100. The air cells 100, 100*a* can be configured to inflate/deflate, function, and otherwise operate in a similar fashion.

With reference back to FIG. 7, the second air support member 96 is removably positioned within (or received by) the pelvic well 56. The second air support member 96 defines a third support. The third support defines a third air bladder (or third air chamber or third internal air chamber) (not shown). Stated another way, the second air support member 96 defines the third air bladder. The third air bladder includes a plurality of air cells 100 (or a third plurality of air cells 100). The third air bladder is configured for selective adjustment of the inflation level, separate from the first and second air bladders.

In the illustrated embodiment, the first air support member 92 and the second air support member 96 are each formed of neoprene. In other examples of embodiments, the support members 92, 96 can be formed of any material for transferring air, storing air, and providing support for a user while sitting.

Figure 9:
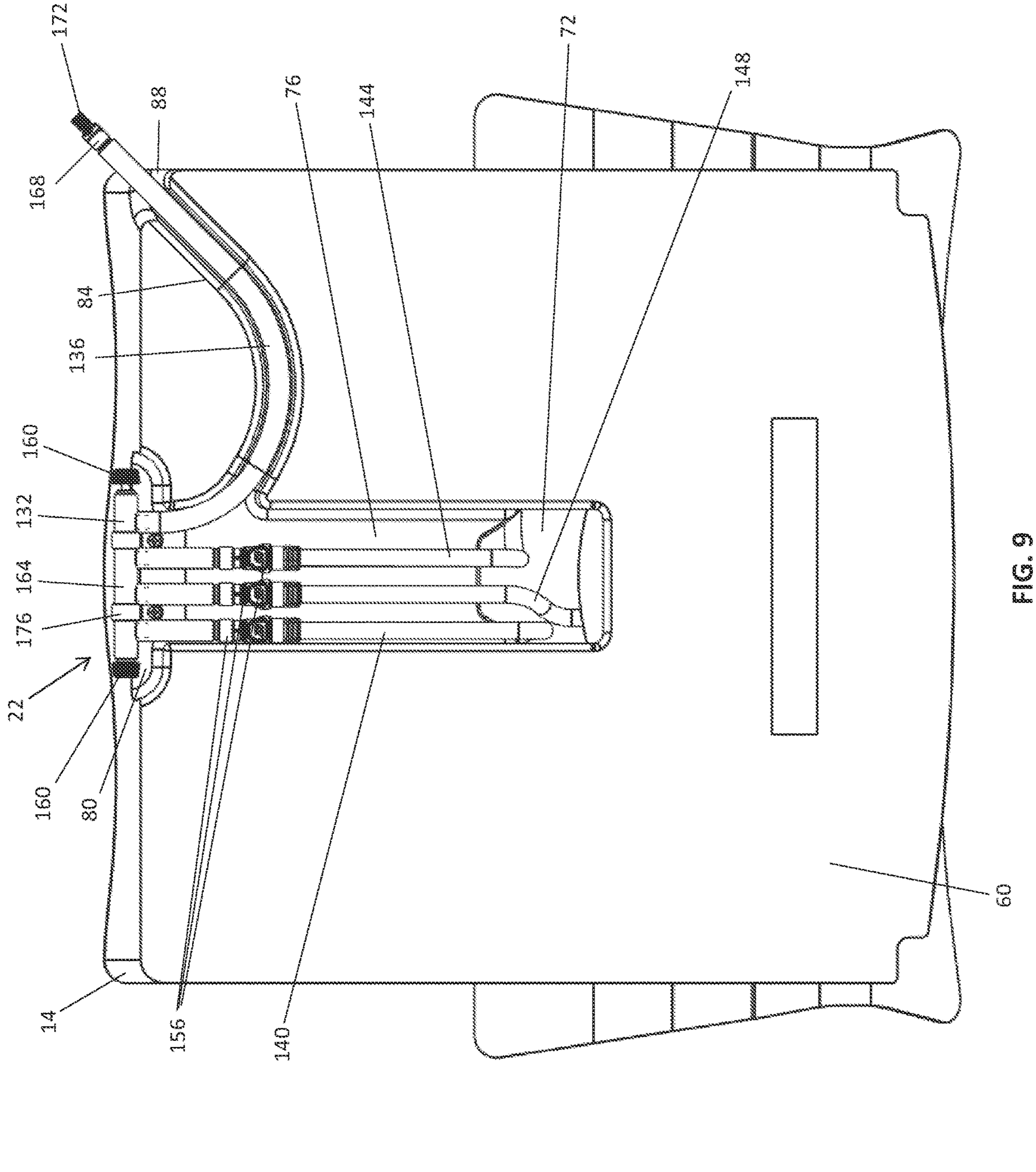
FIG. 9 is a bottom view of the adjustable seat cushion assembly of FIG. 1.

Referring now to FIGS. 1 and 9, the airflow control assembly 22 is in fluid communication with the adjustable air pad assembly 18. More specifically, the airflow control assembly 22 is in fluid communication with the first air support member 92 and the second air support member 96. The airflow control assembly 22 is configured to facilitate selective inflation and/or deflation of each of the first air bladder and associated first plurality of air cells 100, 100*a*, the second air bladder and associated second plurality of air cells 100, 100*a*, and the third air bladder and associated third plurality of air cells 100.

With reference to FIG. 9, the air flow control assembly 22 includes a valve 132 (also referred to as a control valve 132). A first conduit 136 (also referred to as an air supply conduit 136 or a first air conduit 136) is in fluid communication with (or fluidly connected to) the valve 132. A plurality of conduits fluidly connect the valve 132 to the adjustable air pad assembly 18, and more specifically to each of the air bladders of the first air support member 92 and the second air support member 96.

With reference to FIGS. 7 and 9, a second conduit 140 (also referred to as a first bladder supply conduit 140 or a second air conduit 140) is in fluid communication with (or fluidly connects) the valve 132 and the first side support 108. A third conduit 144 (also referred to as a second bladder supply conduit 144 or a third air conduit 144) is in fluid communication with (or fluidly connects) the valve 132 and the second side support 112. Accordingly, a plurality of conduits 140, 144 fluidly connect the valve 132 and the first air support member 92. A fourth conduit 148 (also referred to as a third bladder supply conduit 148 or a fourth air conduit 148) is in fluid communication with (or fluidly connects) the valve 132 and the second air support member 96. With reference back to FIG. 7, each of the conduits 140, 144, 148 are configured to removably couple (or selectively couple) to a supply valve 152 (or a valve stem 152) associated with each air bladder of the first and second air support members 92, 96. In other embodiments, each of the conduits 140, 144, 148 can be coupled to the respective first and second air support members 92, 96 by a non-removal connection.

With reference back to FIG. 9, each of the conduits 140, 144, 148 includes a fluid coupling 156 to selectively connect and disconnect the conduit 140, 144, 148 to the valve 132. For example, the fluid coupling 156 can be a quick disconnect coupling, such as an in-line male coupling that selectively engages an in-line female coupling. An example of a suitable quick disconnect coupling includes a fluid quick coupling manufactured by LinkTech Couplings, a division of Nordson Corporation, which has a corporate headquarters in Westlake, Ohio. In other embodiments, the fluid coupling 156 can be any suitable coupling that facilitates a selective (or detachable) fluid connection between the valve 132 and each conduit 140, 144, 148 can be used.

The valve 132 includes an internal slide (not shown) coupled to opposing knobs 160. The slide is configured to laterally slide within a valve housing 164. By laterally moving the internal slide relative to the valve housing 164 in a first direction, the valve 132 selectively fluidly connects the conduits 140, 144, 148 to the air supply conduit 136. Moving the internal slide relative to the valve housing 164 laterally in a second, opposite direction fluidly disconnects the conduits 140, 144, 148 and the air supply conduit 136. An example valve 132 is the ISOFLO valve sold by Roho, Inc., a division of Permobil AB, which has a corporate headquarters in Timrå, Sweden. The valve is also disclosed in U.S. Pat. No. 6,564,410, the contents of which are incorporated by reference in its entirety. In other embodiments, the valve 132 can be any suitable valve that provides a selective fluid connection between conduit 136 and conduits 140, 144, 148 to facilitate inflation and/or deflation of the first and second air support members 92, 96.

An air valve 168 (or inflation/deflation valve 168) is coupled to the first conduit 136 at an end opposite the connection to the valve 132. The air valve 168 includes a valve cap 172. The valve cap 172 is rotatably connected to the air valve 168 to facilitate opening and closing of the air valve 168. For example, rotation of the valve cap 172 in a first direction facilitates opening of the air valve 168, while rotation of the valve cap 172 in a second direction, opposite the first direction, facilitate closing of the air valve 168. The air valve 168 is configured to engage an air pump (not shown). The air pump can be a hand pump, a manual pump, a motorized pump, or any other suitable pump that is configured to supply air to the adjustable air pad assembly 18.

The air flow control assembly 22 is mounted (or coupled) to the base 14, and more specifically the bottom surface 60 of the base 14. This allows the air flow control assembly 22 and the associated components to be concealed, limiting exposure to potential damage and/or unintentional adjustment of the adjustable air pad assembly 18. The valve 132 is mounted in the valve access end 80 of the recessed channel 76. The valve 132 is mounted by a mounting assembly 176. The mounting assembly 176 includes a plurality of loops that surround the valve housing 164. The loops are fastened to the base 14 by one or more fasteners (e.g., a screw, a bolt, etc.). The valve 132 extends outward from the valve access end 80 such that it is exposed (or partially exposed) to provide user access to the valve 132. The first conduit 136 is positioned in (or received by) the secondary channel 84. The secondary channel 84 can be suitably sized to form a friction fit with the first conduit 136 to selectively retain the first conduit 136 in the secondary channel 84. A portion of the first conduit 136 extends through the air nozzle access end 88 to provide user access to the air valve 168. The conduits 140, 144, 148 are positioned in the recessed channel 76, extending from the valve 132 through the aperture 72. The conduits 140, 144, 148 then extend through the aperture 72 and into the conduits pelvic well 56, where the conduits 140, 144, 148 connect to the respective first and/or second air support members 92, 96.

In operation, the air pad assembly 18 is configured to be selectively inflated and/or deflated to provide customized support for a user. To inflate the air pad assembly 18, the air pump is coupled to the air valve 168, and the valve cap 172 is actuated (rotated) into an open configuration. The valve 132 is similarly actuated into an open configuration, for example by sliding the internal slide laterally relative to the valve housing 164 in a first direction to create a fluid connection between the first conduit 136 and the conduits 140, 144, 148. The pump can then supply air through the first conduit 136 and to the valve 132, where air is distributed to the second conduit 140, the third conduit 144, and the fourth conduit 148. Air travels through the conduits 140, 144, 148 to the respective first, second, and third air bladders of the first and second air support members 92, 96. This inflates the plurality of air cells 100, 100*a* associated with the first side support 108 and the second side support 112, and the air cells 100 of the second air support member 96. Once the air pad assembly 18 is suitably inflated, the valve cap 172 is actuated (rotated) into a closed configuration. The valve 132 can also be actuated into a closed configuration, for example by sliding the internal slide laterally relative to the valve housing 164 in a second direction, opposite the first direction to terminate (or block) the fluid connection between the first conduit 136 and the conduits 140, 144, 148. The air pump can be removed (or disengaged) from the air valve 168.

After an initial inflation of the air pad assembly 18, selective adjustment of the inflation level of the first and second air support members 92, 96 can occur. For example, the valve cap 172 can be actuated into the closed configuration. With the valve 132 remaining in an open configuration, a user can engage the air pad assembly 18, and more specifically can engage the first side support 108 and the second side support 112, and the air cells 100 of the second air support member 96. This can facilitate a redistribution of air within the air pad assembly 18. For example, air can then travel from the first side support 108 to the valve 132 through the second conduit 140. This air can then be redistributed from the valve 132 to the second side support 112 (through the third conduit 144) and/or to the second air support member 96 (through the fourth conduit 148). As another example, air can travel from the second side support 112 to the valve 132 through the third conduit 144. This air can then be redistributed from the valve 132 to the first side support 108 (though the second conduit 140) and/or to the second air support member 96 (through the fourth conduit 148). As another example, air can travel from the second air support member to the valve 132 through the fourth conduit 148. This air can then be redistributed from the valve 132 to the first side support 108 (though the second conduit 140) and/or to the second air support member 96 (through the fourth conduit 148). It should be appreciated that if the air pad assembly 18 is overinflated (or it is desired to reduce the total amount of air within the air pad assembly 18), the valve cap 172 can be actuated into the open configuration to deflate the air pad assembly 18 to a desired inflation level. If the air pad assembly 18 is underinflated (or it is desired to increase the total amount of air within the air pad assembly 18), the valve cap 172 can be actuated into the open configuration and air can be introduced into the air pad assembly 18 by the air pump to reach a desired inflation level. Once the desired inflation level is achieved (either by deflation or inflation), the valve cap 172 can be actuated into the closed configuration. Once the desired inflation level of the air pad assembly 18, and the first side support 108, the second side support 112, and the air cells 100 of the second air support member 96 is achieved, the valve 132 can be actuated into a closed configuration to maintain the selected inflation level of the first side support 108, the second side support 112, and the air cells 100 of the second air support member 96.

To deflate the air pad assembly 18, the valve cap 172 of the air valve 168 is actuated (rotated) into the open configuration. The valve 132 is similarly actuated into an open configuration, for example by sliding the internal slide laterally relative to the valve housing 164 in a first direction to create a fluid connection between the first conduit 136 and the conduits 140, 144, 148. With a user contacting the air pad assembly 18 (e.g., sitting on the air pad assembly 18), air travels through from the respective first, second, and third air bladders of the first and second air support members 92, 96, through the conduits 140, 144, 148, through the valve 132, and out through the first conduit 136, where the air is discharged through the air valve 168. Once the user is properly positioned on the air pad assembly 18, and a desired (or suitable) inflation level is achieved, the valve cap 172 is actuated (rotated) into a closed configuration. The valve 132 can also be actuated into the closed configuration, for example by sliding the internal slide laterally relative to the valve housing 164 in a second direction, opposite the first direction to terminate (or block) the fluid connection between the first conduit 136 and the conduits 140, 144, 148.

One or more aspects of the adjustable seat cushion assembly 10 for a chair provides certain advantages. For example, the adjustable seat cushion assembly 10 provides two materials (or support materials) for improved user support while sitting. The first material being a foam material and the second material being air. The first material is firmer than the second material. As such the first material (foam) is provided to support a leg region of a user, while a combination of the first material (foam) and the second material (air) is provided to support a pelvic region of a user. The second material (air) is advantageously adjustable and customizable to provide selective support for a user. The adjustability and customization of support occurs while the user is engaged with the adjustable seat cushion assembly 10 (e.g., sitting on the adjustable seat cushion assembly 10). Accordingly, adjustment and customization of the air pad assembly 18 occurs with minimal disruption to the user (i.e., the user does not need to be removed from the seat cushion assembly 10 during adjustment or customization of the air pad assembly 18).

The combination of the first material (foam) and the second material (air), along with the unique recessed support portion 52 and pelvic well 56, reduces an immersion depth of a user into the adjustable air pad assembly 18 that is needed to provide full contact and support to the pelvic region of the user. In a seat cushion assembly that utilizes only air, a user generally needs to immerse into the seat cushion between approximately two inches and three inches for the seat cushion to fully contact the user. Full contact is necessary to provide adequate support for the user. The recessed support portion 52 and associated pelvic well 56 formed of the first material (foam), along with the second material (air) of the overlaying adjustable air pad assembly 18 achieves full contact with the user at a reduced immersion depth. For example, a user need only immerse approximately one inch into the adjustable air pad assembly 18, and more specifically into the first air support member 92 and/or second air support member 96, to achieve full user contact. The reduced immersion depth allows the adjustable air pad assembly 18 to utilize shorter (or less tall) air cells 100, 100*a*.

In addition, the air pad assembly 18 includes a plurality of separate air zones to provide selective support for a user. The first air support member 92 defines two separate air support zones that are symmetrically arranged. A first air zone (or first air support zone) corresponds to the first side support 108 (and associated first air bladder and plurality of air cells 100, 100*a*). A second air zone (or second air support zone) corresponds to the second side support 112 (and associated second air bladder and plurality of air cells 100, 100*a*). In addition, the second air support member 96 defines a third air zone (or a third air support zone). The three air zones are independent, and can be separately adjusted and/or customized. In addition, as a user moves on the seat cushion assembly 10, air from the three air zones does not move to any other air zone. As such, the three separate air zones improve positional stability.

Figure 10:
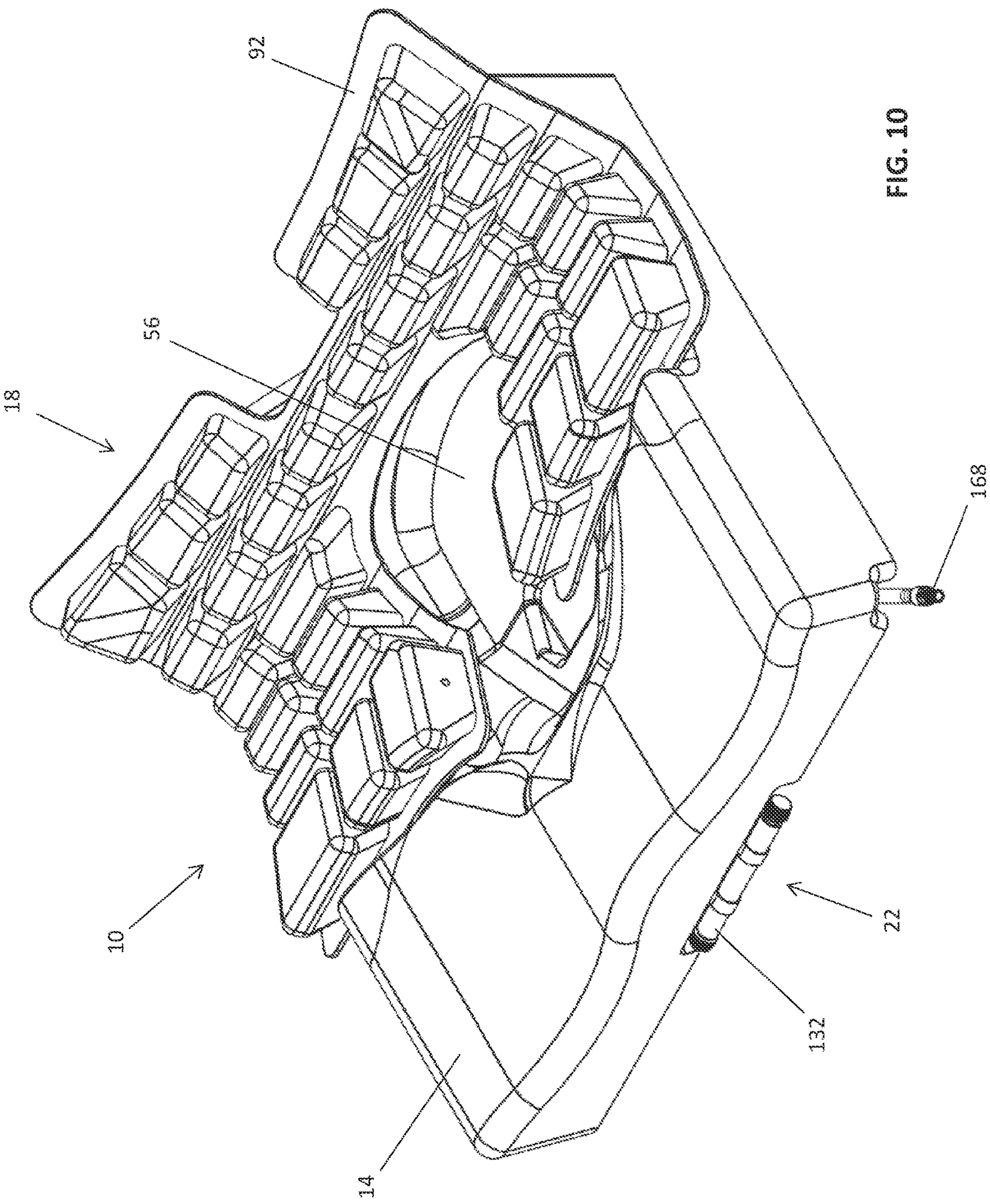
FIG. 10 is a perspective view of the adjustable seat cushion assembly of FIG. 1 illustrating a configuration with the second air support member removed from the base, the conduits are not shown for purposes of clarity.

Further, the air pad assembly 18 can be further customized by removing one of the first air support member 92 or the second air support member 96. In the illustrated embodiment (or a first configuration), the adjustable seat cushion assembly 10 includes both of the first air support member 92 and the second air support member 96. However, in certain situations, it may be desirable for a user not to use one of the first air support member 92 or the second air support member 96. Accordingly, the first air support member 92 or the second air support member 96 can be selectively removed from the adjustable seat cushion assembly 10. In one embodiment (or a second configuration), the first air support member 92 can be removed by disengaging the fluid coupling 156 positioned in the first and second conduits 140, 144. The first air support member 92 can then be removed (or disengaged) from the base 14. The remaining second air support member 96 can be adjusted or customized to provide suitable support for a user in combination with the base 14. In another embodiment (or a third configuration), shown in FIG. 10, the second air support member 96 can be removed by disengaging the fluid coupling 156 positioned in the third conduit 148. The second air support member 96 can then be removed (or disengaged) from the base 14. The remaining first air support member 92 can be adjusted or customized to provide suitable support for a user in combination with the base 14. This configuration allows a user to float their ischial tuberosity bones over the pelvic well 56.

In addition, the combination base 14 and air pad assembly 18 can provide improved support to reduce pressure related injuries and allow a user to offload their ischial tuberosity (or "sit bones"). The defined recessed leg troughs 40*a*, 40*b* formed of a foam material provides comfort and support for a user's leg region. The recessed support portion 52 and associated pelvic well 56 covered by the adjustable first and second air support members 92, 96 create a stable support platform for the pelvic region of the user, while also facilitating a user to offload their ischial tuberosity (or "sit bones").

The air pad assembly 18 also includes a two-part deflation protection system for reducing a risk of unintentional or accidental deflation of the air pad assembly 18. For example, in response to the valve 132 being in the closed configuration, but the valve cap 172 being in an open configuration, the valve 132 prevents deflation of the first side support 108, the second side support 112, and the air cells 100 of the second air support member 96. As such, in situations where the valve cap 172 is accidentally or unintentionally placed into the open configuration, the valve 132, when in the closed configuration, can block air flow and associated deflation of the air pad assembly 18.

Additional features and advantages of the invention are set forth in the disclosure and the following claims.

What is claimed is:

1. A seat cushion assembly comprising:

a base defining a leg support, a first side opposite a second side, a back ledge extending between the first and second sides, a support portion recessed relative to the leg support, and a well recessed relative to the support portion, the support portion extends around a portion of the well between the first side and the well, the back ledge and the well, and the second side and the well; and a pad assembly including a first support member and a second support member, the first support member positioned on the recessed support portion, and the second support member being removably received by the well, wherein the first support member partially surrounds and does not cover the well, wherein the first support member defines a plurality of cells, the plurality of cells include at least one first cell having a first shape and at least one second cell having a second shape that is different than the first shape, and wherein the at least one first cell includes a sloped sidewall portion, the at least one first cell is positioned on the base such that the sloped sidewall portion extends from the leg support to the support portion.

2. The seat cushion assembly of claim 1, wherein the leg support includes a pair of recessed leg troughs.

3. The seat cushion assembly of claim 1, wherein the first support member defines an aperture extending therethrough, the aperture is positioned over the well.

4. The seat cushion assembly of claim 1, wherein the first support member includes an aperture, the aperture is vertically aligned with the well.

5. The seat cushion assembly of claim 1, wherein the seat cushion assembly is configured for operation in a first configuration or a second configuration, wherein in the first configuration the first support member is positioned on the support portion and extends around a portion of the well, and the second support member is positioned in the well, and wherein in the second configuration the first support member is positioned on the support portion and extends around a portion of the well, and the second support member is removed from the well.

6. The seat cushion assembly of claim 1, wherein the support portion is sloped from each of the first side, the second side, and the back ledge towards the well.

7. The seat cushion assembly of claim 1, wherein the back ledge includes a central channel defining a lowest height of the back ledge.

8. The seat cushion assembly of claim 1, wherein the first support member defines a plurality of first cells, each of the first cells include a first portion opposite a second portion and a sloped edge extending between the first and second portions.

9. The seat cushion assembly of claim 8, wherein the first portion is larger than the second portion.

10. The seat cushion assembly of claim 8, wherein the second portion is connected to the first support member.

11. The seat cushion assembly of claim 8, wherein the base includes a transitional edge between the leg support and the support portion, the first cells overhang the transitional edge.

12. The seat cushion assembly of claim 8, wherein the plurality of first cells extend from the support portion to the leg support.

13. The seat cushion assembly of claim 1, wherein the first side and the second side are each recessed relative to the back ledge and the leg support.

14. A seat cushion assembly comprising:

a base defining a leg support, a support portion recessed relative to the leg support, and a well recessed relative to the support portion; and a pad assembly including a first support member and a second support member, the first support member defines an aperture, wherein the seat cushion assembly is configured for operation in one of a first configuration or a second configuration, wherein in the first configuration the first support member is positioned on the support portion and partially surrounds the well, the aperture of the first support member is vertically aligned with the well, and the second support member is positioned in the well, and wherein in the second configuration the first support member is positioned on the support portion and partially surrounds the well, the aperture of the first support member is vertically aligned with the well, and the second support member is removed from the well, wherein the first support member defines at least one first cell, the at least one first cell includes a top surface opposite a bottom surface, and an angled side surface extending between the top surface and the bottom surface, the top surface having a length that is greater than a length of the bottom surface, wherein the base includes a transitional edge between the leg support and the support portion, and the angled side surface extends over the transitional edge.

15. The seat cushion assembly of claim 14, wherein the first support member defines at least one first cell, the at least one first cell extends from the support portion to the leg support.

16. The seat cushion assembly of claim 15, wherein the at least one first cell is configured to overhang a transition between the support portion and the leg support.

17. The seat cushion assembly of claim 14, wherein the base includes a first side opposite a second side, and a back ledge extending between the first and second sides, the support portion is sloped from each of the first side, the second side, and the back end towards the well.

* * * * *